United States Patent
Duncalf

(10) Patent No.: US 6,471,031 B1
(45) Date of Patent: Oct. 29, 2002

(54) MOBILE CONVEYOR SYSTEM

(76) Inventor: Stanley R. Duncalf, 1701 Circle Dr., Waverly, IA (US) 50677

( * ) Notice: Subject to any disclaimer, the term of this patent is extended or adjusted under 35 U.S.C. 154(b) by 0 days.

(21) Appl. No.: 09/756,260

(22) Filed: Jan. 8, 2001

(51) Int. Cl.⁷ ............................................. B65G 21/12
(52) U.S. Cl. ...................................... 198/311; 198/313
(58) Field of Search ................................ 198/311, 313; 414/482, 483, 523

(56) References Cited

U.S. PATENT DOCUMENTS

| | | | |
|---|---|---|---|
| 2,759,591 A | | 8/1956 | Erickson ..................... 198/122 |
| 3,154,189 A | | 10/1964 | O'Hanlon et al. ............ 198/91 |
| 3,339,708 A | | 9/1967 | Luksich ....................... 198/139 |
| 3,341,039 A | | 9/1967 | Cranage .................. 214/83.26 |
| 4,058,198 A | | 11/1977 | O'Neill et al. .............. 198/313 |
| 4,095,705 A | * | 6/1978 | Hood .......................... 198/532 |
| 4,190,526 A | * | 2/1980 | Bachand ..................... 209/245 |
| 4,350,241 A | | 9/1982 | Wenzel ....................... 198/311 |
| 4,512,687 A | * | 4/1985 | Enns ........................... 198/318 |
| 4,591,432 A | * | 5/1986 | Hartl ........................... 198/313 |
| 4,603,775 A | * | 8/1986 | Plett ............................ 198/311 |
| 4,669,945 A | * | 6/1987 | Pollard et al. .............. 198/313 |
| 5,090,550 A | | 2/1992 | Axmann ...................... 198/313 |
| 5,165,512 A | * | 11/1992 | Driear ......................... 198/318 |
| 5,516,253 A | * | 5/1996 | Linscheid et al. .......... 198/313 |
| 5,655,872 A | * | 8/1997 | Plotkin ........................ 198/313 |
| 6,129,196 A | | 10/2000 | Lapper et al. .............. 198/313 |

OTHER PUBLICATIONS

FECO—Two photographs of legs used to raise hopper—competition.
Floater Loader *Ray–Man* brochure.

* cited by examiner

*Primary Examiner*—Douglas Hess
(74) *Attorney, Agent, or Firm*—McKee, Voorhees & Sease, P.L.C.

(57) ABSTRACT

An improved mobile belt conveyor is provided which can be quickly and easily converted between use and transport positions. A conveyor frame is pivotally connected to a hopper frame, with hydraulic cylinders controlling the angular position of the hopper relative to the conveyor frame. When the hydraulic cylinders are retracted, the hopper is pivoted upwardly relative to the conveyor, thereby raising a hitch on the forward end of the hopper such that a vehicle can be positioned beneath the hitch. When the hydraulic cylinders are extended, the hopper is pivoted downwardly relative to the conveyor, such that the hitch is lowered onto a hitch receiver on the tractor or vehicle. Thus, a simple two-step process is provided for movement of the conveyor system between the use and transport positions.

15 Claims, 5 Drawing Sheets

MOBILE CONVEYOR SYSTEM

BACKGROUND OF THE INVENTION

Mobile belt conveyors with attached hoppers are known in the art. Such belt conveyors include wheels for transportation, and are used to convey fertilizer, lime, dirt, rock, and other particulate material. The hopper is connected to the conveyor adjacent the inlet end of the conveyor. A conveyor belt is trained about a drive roller at the discharge end of the conveyor frame and an idler roller on the opposite end of the hopper. The belt is driven by a motor. In one known conveyor system, a hitch is provided adjacent the discharge end of the conveyor for hitching the conveyor to a tractor or vehicle, with the hopper being pivoted beneath the conveyor during transport. In another form of the conveyor system, the hitch is provided on the free end of the hopper, with hydraulically actuated pivotal legs to support the system above the ground for hitching a tractor or vehicle to the hopper. Such pivotal legs require a pin for holding the conveyor straight for transport down a road.

The moving or conversion of these prior art conveyor systems between the transport and use positions is slow and cumbersome.

Therefore, a primary objective of the present invention is the provision of an improved mobile belt conveyor which can be quickly and easily moved between the transport and use positions.

Another objective of the present invention is the provision of an improved belt conveyor having a hopper connected thereto with a hitch on the hopper that can be raised and lowered for connecting to a hitch receiver.

A further objective of the present invention is the provision of an improved mobile belt conveyor having a simple hydraulic system for hitching and unhitching the system to a tractor or vehicle.

Still another objective of the present invention is the provision of an improved mobile belt conveyor which is economical to manufacture and durable in use.

These and other objectives will become apparent from the following description of the invention.

SUMMARY OF THE INVENTION

The improved mobile belt conveyor of the present invention includes a conveyor frame with opposite forward and rearward ends. A belt conveyor extends along the conveyor and hopper frames, and is driven by a motor. A hopper has a rearward end pivotally connected to the forward end of the conveyor frame. The forward end of the hopper includes a hitch. A pair of hydraulic cylinders have one end connected to the conveyor frame and an opposite end connected to the hopper. A control valve is provided for actuating the hydraulic cylinders. When the cylinders are retracted, the hopper pivots upwardly relative to the conveyor frame, thereby raising the hitch, such that a tractor or vehicle can be backed under the hitch. Extension of the hydraulic cylinders pivots the hopper downwardly relative to the conveyor frame, thereby lowering the hitch onto a hitch receiver on the tractor or vehicle. In the transport position, the hopper and conveyor frame are substantially aligned for transportation down a road. In the used position, the hopper is flat on the ground, with the conveyor extending upwardly for discharge of particulate material into a receptacle, such as a truck bed.

DETAILED DESCRIPTION OF THE DRAWINGS

Figure 1:
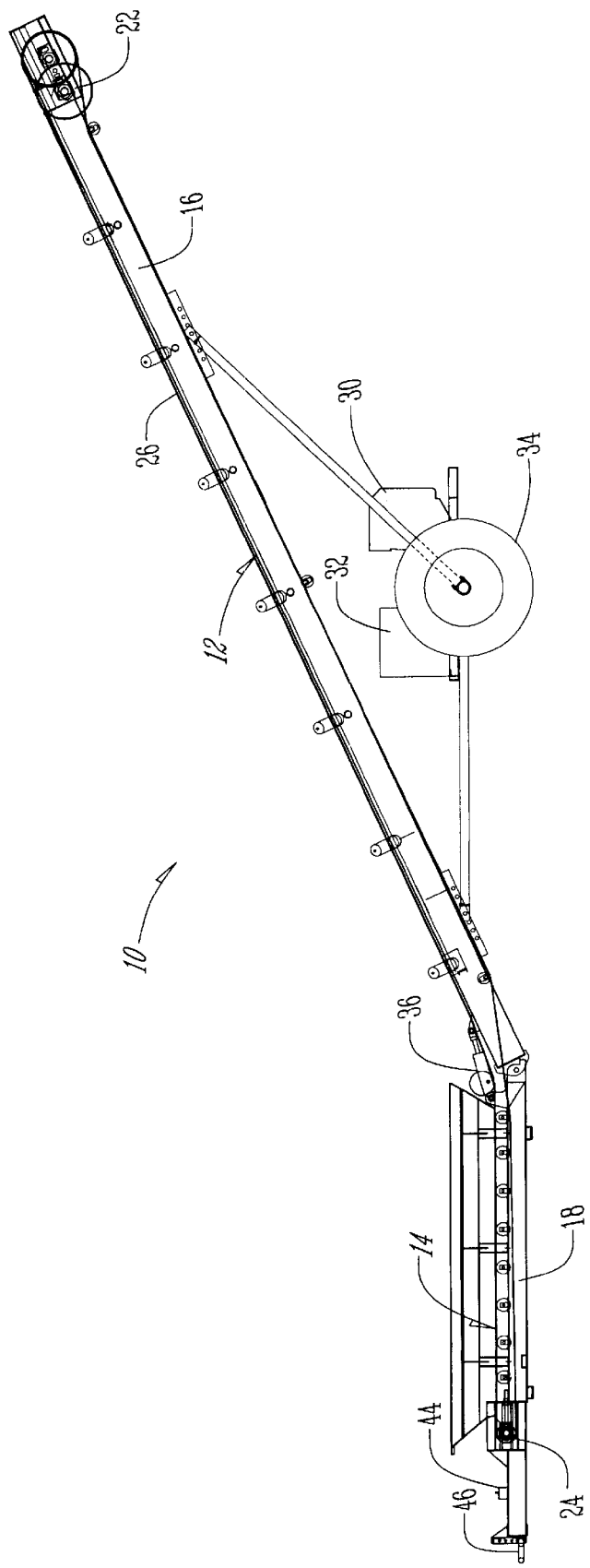
FIG. 1 is a side elevation view of the conveyor system of the present invention in a use position.

The conveyor system of the present invention is generally designated in the drawings by the reference numeral 10. The system includes a conveyor 12 and a hopper 14. The conveyor 12 includes a frame 16, and the hopper 14 includes a frame 18. The rearward end of the hopper frame 18 is pivotally connected to the forward end of the conveyor frame 16 via pivot pins 20 on each side of the frames 16, 18.

The rearward or discharge end of the conveyor frame 16 includes a drive roller 22. The forward end of the hopper frame 18 includes an idler roller 24. A conveyor belt 26 is trained about the drive roller 22 and the idler roller 24. A plurality of support rollers 28 extend across the conveyor frame 16 and the hopper frame 18 to provide support for the conveyor belt 26. A motor 30 is operatively connected to the drive roller 22 in any convenient manner so as to drive the belt 26. A fuel tank 32 is provided for the motor 30. The conveyor system 10 is mounted on a pair of wheels 34 for transport along a road or in a field.

A hydraulic system controls the angular orientation of the hopper 14 relative to the conveyor 12. More particularly, a pair of hydraulic cylinders 36 are provided on opposite sides of the conveyor system 10 adjacent the pivot pins 20. The cylinder arm 40 is connected to a pair of ears 38 extending upwardly on the forward end of the conveyor frame 16, while the opposite end of each cylinder is connected to a pair of ears 42 extending upwardly from the rearward end of the hopper frame 18.

A hitch 46 is provided on the forward end of the hopper frame 18. While the drawings show a pintle hitch, other types of hitches may be utilized, such as a clevis hitch. A control valve 44 is provided for actuating the hydraulic cylinders 36.

Figure 2:
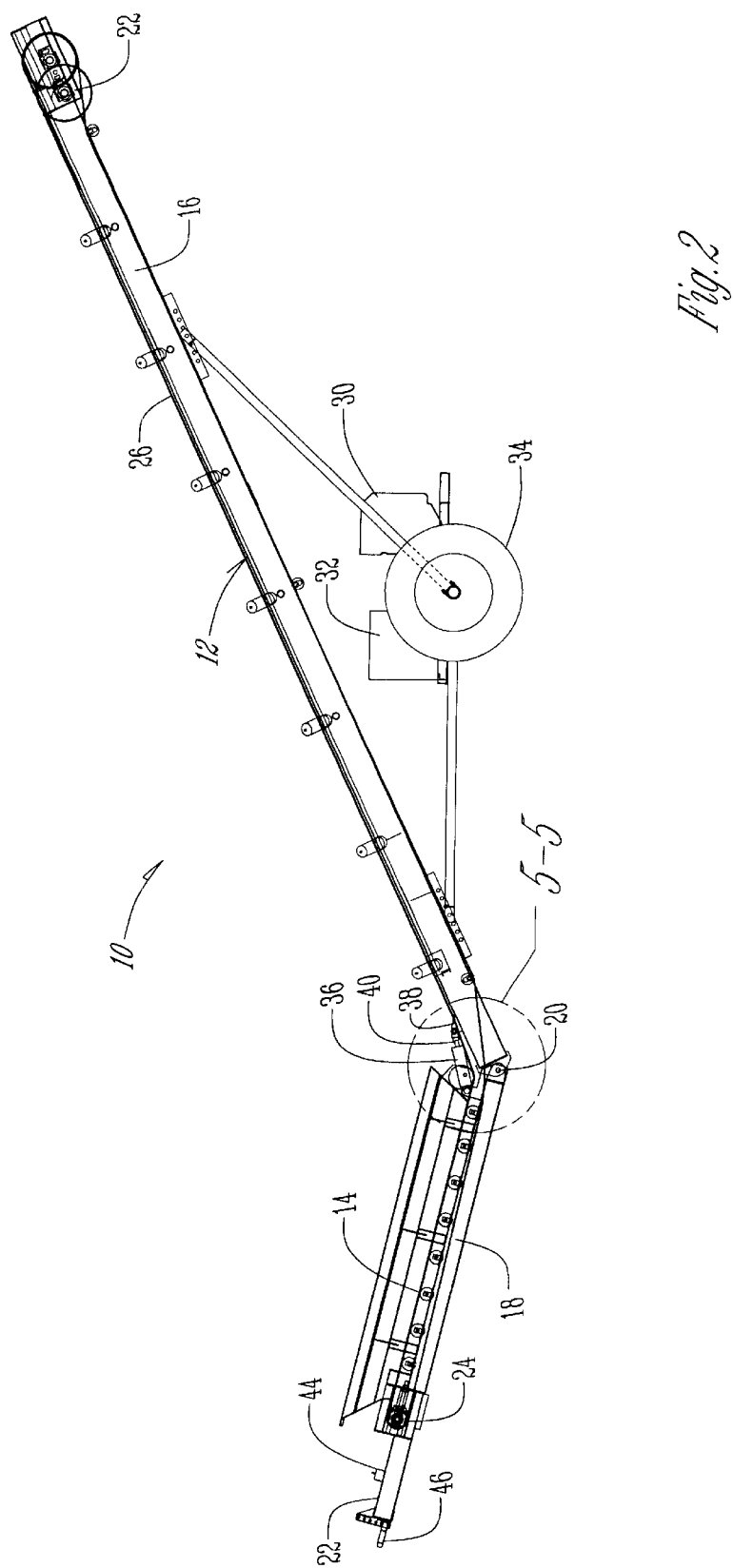
FIG. 2 is a side elevation view of the conveyor system with the hitch in a raised position.
Figure 3:
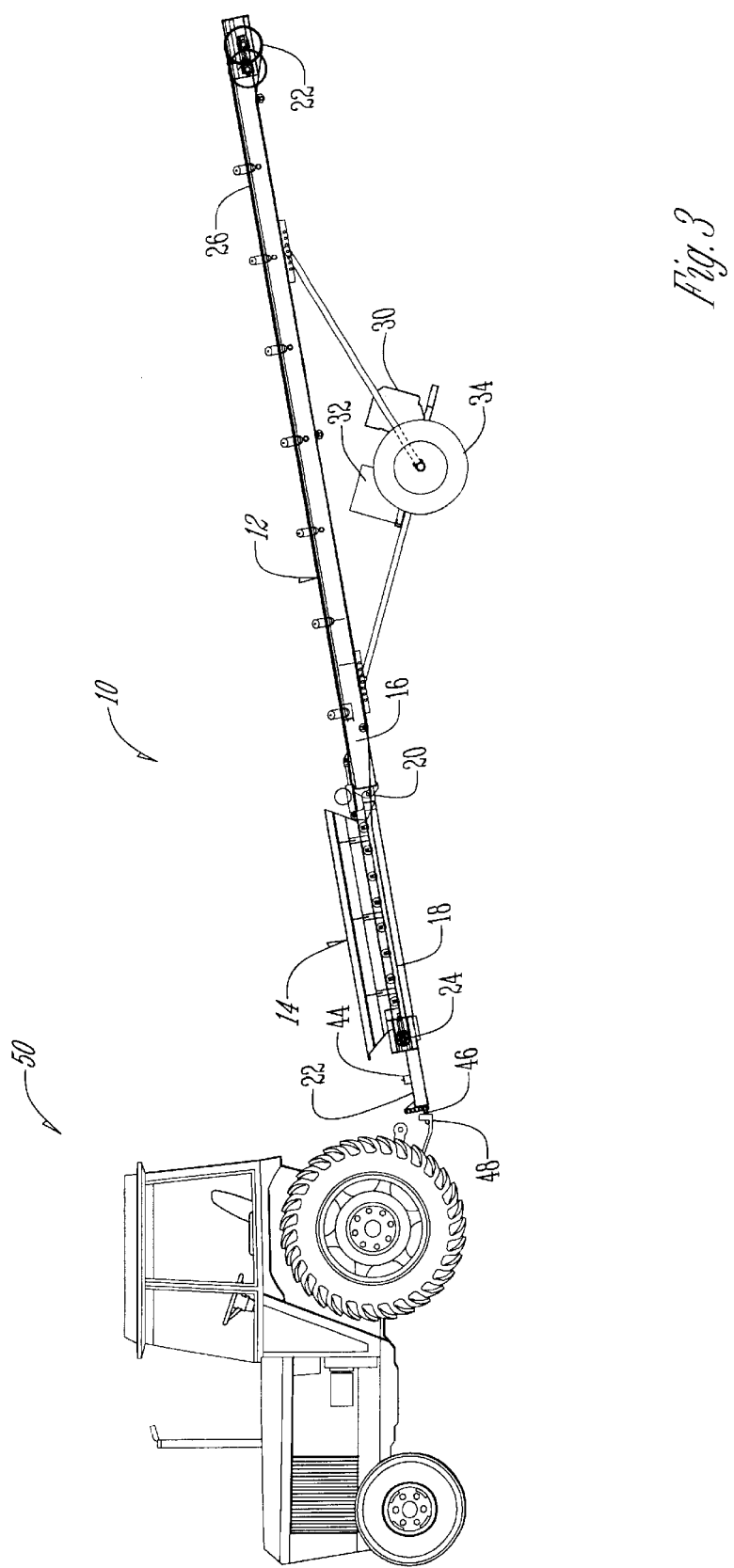
FIG. 3 is a side elevation view of the conveyor system with the hitch in a lowered position.
Figure 4:
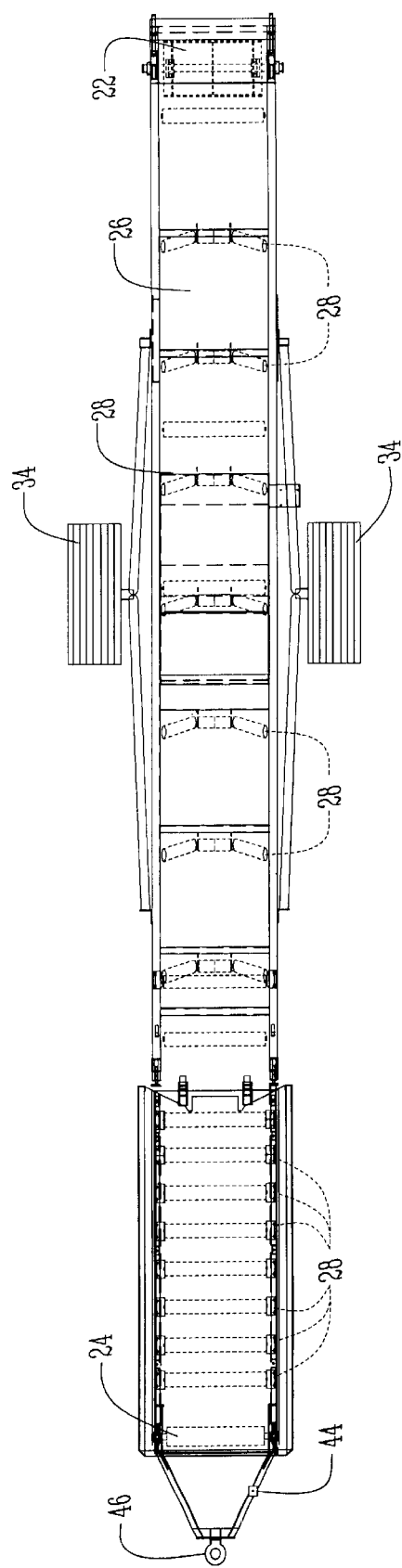
FIG. 4 is a top plan view of the conveyor system of the present invention.
Figure 5:
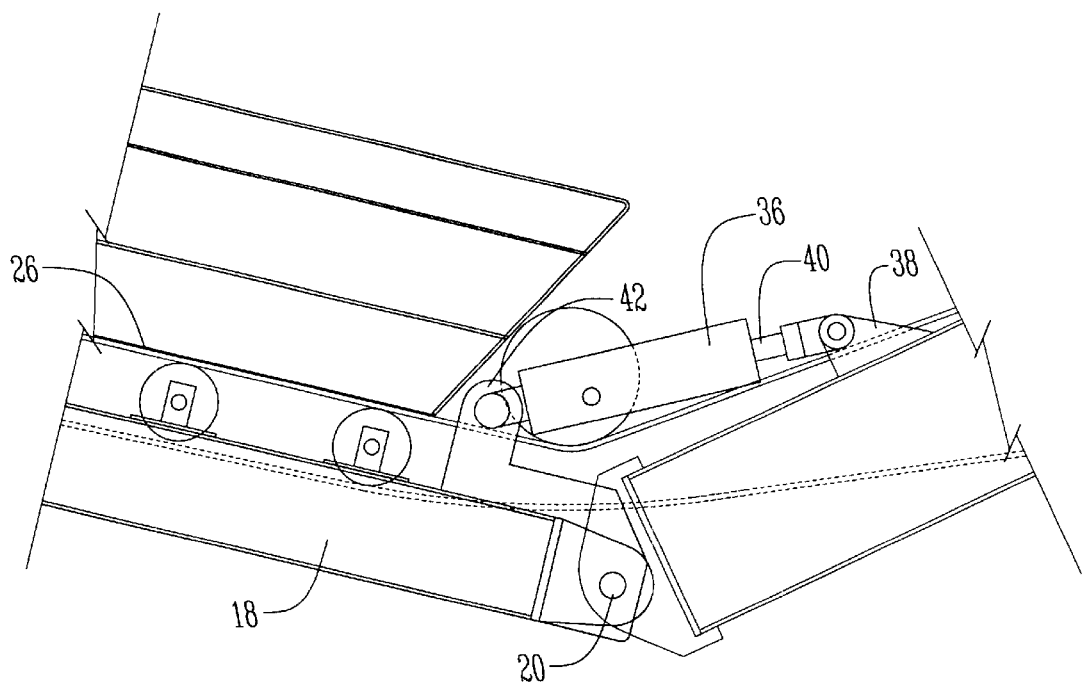
FIG. 5 is an enlarged side elevation view taken along lines 5—5 of FIG. 2.

The conveyor system 10 of the present invention can be moved or converted between the use position shown in FIG. 1 and the transport position shown in FIG. 3. When the hydraulic cylinders 36 are actuated by the control valve 44 so as to retract the arms 40, the hopper 14 is pivoted upwardly relative to the conveyor 12, as shown in FIG. 2, thereby raising the hitch 46. With the hitch raised, a tractor or other vehicle can be backed beneath the hitch 46.

The control valve 44 can then be actuated so as to extend the cylinder arms 40, thereby pivoting the hopper 14 downwardly relative to the conveyor 12, such that the hitch 46 is lowered onto a hitch receiver 48, so as to be in the transport position shown in FIG. 3. In the transport position, the hopper frame 18 is substantially aligned with the conveyor frame 16.

To move from the transport position to the use position, the cylinder arms 40 are retracted to raise the hitch 46 from the hitch receiver 48 and the tractor or vehicle 50 is pulled away from the conveyor system 10. The cylinder arms 40 are then extended until the hopper 14 is lowered into contact with the ground, so as to be in the use position shown in FIG. 1.

It is noted that with the conveyor system of the present invention, no stabilizing legs or other support structure is necessary to support the conveyor 12 or hopper 14 during the conversion between the use and transport positions. The conversion involves a simple two-step process, wherein the hitch is first raised and then lowered by the hydraulic cylinders 36. Also, no pins or other hardware is necessary to hold the hitch or hopper in the raised or lowered positions.

Thus, the conveyor system of the present invention provides a quick and easy structure and method for moving the conveyor between the use and transport positions.

In the drawings and specification there has been set forth a preferred embodiment of the invention, and although specific terms are employed, these are used in a generic and descriptive sense only and not for purposes of limitation.

Changes in the form and the proportion of parts as well as in the substitution of equivalents are contemplated as circumstances may suggest or render expedient without departing from the spirit or scope of the invention as further defined in the following claims.

What is claimed is:

1. An improved mobile belt conveyor system comprising:
   a conveyor frame with opposite forward and rearward ends;
   a hopper having a rearward end pivotally connected to the forward end of the conveyor frame and an opposite forward end;
   a belt conveyor extending along the conveyor frame;
   a motor for driving the belt conveyor;
   a hitch on the forward end of the hopper;
   a first hydraulic cylinder having one end connected to the conveyor frame and an opposite end connected to the hopper; and
   wherein actuation of the hydraulic cylinder pivots the hopper relative to the conveyor frame, thereby raising and lowering the hitch.

2. The improved system of claim 1 further comprising a second hydraulic cylinder having one end connected to the conveyor frame and an opposite end connected to the hopper, the first and second hydraulic cylinders being on opposite sides of the conveyor frame and hopper.

3. The improved system of claim 2 further comprising a valve operatively connected to the first and second hydraulic cylinders to control extension and retraction of the cylinders.

4. The improved system of claim 1 wherein the first hydraulic cylinder is retracted to raise the hitch and extended to lower the hitch.

5. The improved system of claim 1 wherein the hopper is substantially aligned with the conveyor frame for transport of the system.

6. The improved system of claim 1 wherein the hopper is moveable between use and transport positions.

7. The improved system of claim 1 further comprising a valve to control the hydraulic cylinder.

8. The improved system of claim 1 wherein the hopper and conveyor frame include rollers for supporting the belt conveyor.

9. The improved system of claim 1 further comprising wheels on the conveyor frame for transport.

10. An improved mobile conveyor system, including a belt conveyor and a hopper pivotally mounted to the conveyor for movement between transport and use positions, the improvement comprising:
    a hitch on a forward end of the hopper; and
    a hydraulic system connected to the conveyor and to the hopper so as to raise and lower the hitch by pivoting the hopper upwardly towards the conveyor.

11. The improved system of claim 10 wherein the hydraulic system includes a pair of cylinders positioned on opposite sides of the conveyor and hopper.

12. The improved system of claim 11 wherein the hydraulic system includes a control valve for actuating the cylinders.

13. The improved system of claim 11 wherein the cylinders are retracted to raise the hitch and extended to lower the hitch.

14. A method of moving a conveyor and hopper system between transport and use positions, comprising:
    actuating a hydraulic cylinder connected between the conveyor and the hopper to pivot a forward end of the hopper upwardly relative to the conveyor, thereby raising a hitch on the forward end of the hopper;
    positioning a hitch receiver on a vehicle beneath the hitch; and
    pivoting the forward end of the hopper downwardly relative to the conveyor, thereby lowering the hitch onto the hitch receiver.

15. The method of claim 14 further comprising retracting the cylinder to raise the hitch and extending the cylinder to lower the hitch.

* * * * *